United States Patent
Weiss et al.

(10) Patent No.: US 10,358,972 B2
(45) Date of Patent: Jul. 23, 2019

(54) METHOD FOR SPRAYING A FLUID ONTO A CHARGE AIR COOLER OF A MOTOR VEHICLE

(71) Applicant: Dr. Ing. h. c. F. Porsche Aktiengesellschaft, Stuttgart (DE)

(72) Inventors: Marc Weiss, Althengstett (DE); Christian Kunde, Magstadt (DE); Tilo Schoene, Eberdingen (DE)

(73) Assignee: DR. ING. H. C. F. PORSCHE AKTIENGESELLSCHAFT, Stuttgart (DE)

( * ) Notice: Subject to any disclaimer, the term of this patent is extended or adjusted under 35 U.S.C. 154(b) by 83 days.

(21) Appl. No.: 15/485,242

(22) Filed: Apr. 12, 2017

(65) Prior Publication Data

US 2017/0298808 A1 Oct. 19, 2017

(30) Foreign Application Priority Data

Apr. 14, 2016 (DE) .......................... 10 2016 106 919

(51) Int. Cl.
*F01P 9/02* (2006.01)
*F02B 29/04* (2006.01)

(52) U.S. Cl.
CPC ............ *F02B 29/0493* (2013.01); *F01P 9/02* (2013.01); *F02B 29/0475* (2013.01); *F01P 2060/02* (2013.01); *Y02T 10/146* (2013.01)

(58) Field of Classification Search
CPC ..... F02B 29/0493; F02B 29/0475; F01P 9/02; F01P 2060/02; Y02T 10/146
See application file for complete search history.

(56) References Cited

U.S. PATENT DOCUMENTS

| | | | |
|---|---|---|---|
| 5,101,775 A | 4/1992 | Hubbs | |
| 2010/0229549 A1* | 9/2010 | Taylor | F02B 29/0468 60/599 |
| 2014/0046553 A1* | 2/2014 | Otanez | F16H 61/0021 701/51 |
| 2015/0101782 A1 | 4/2015 | Puetzer | |

FOREIGN PATENT DOCUMENTS

| | | |
|---|---|---|
| AT | 506198 B1 | 7/2009 |
| DE | 29621697 U1 | 5/1997 |
| DE | 10320867 A1 | 12/2004 |
| DE | 102013220923 B4 | 4/2015 |
| EP | 1265305 A2 | 12/2002 |

* cited by examiner

*Primary Examiner* — Jacob M Amick
*Assistant Examiner* — Charles Brauch
(74) *Attorney, Agent, or Firm* — Leydig, Voit & Mayer, Ltd.

(57) ABSTRACT

A method for spraying a fluid onto a charge air cooler of a motor vehicle includes measuring a first temperature with the aid of a first sensor of the motor vehicle; measuring a second temperature with the aid of a second sensor of the motor vehicle; comparing the first temperature with a first reference temperature by a controller of the motor vehicle; comparing the second temperature with a second reference temperature by the controller of the motor vehicle if the first temperature is higher than the first reference temperature or equal to the first reference temperature; and spraying at least some of the fluid onto the charge air cooler during a spray-on cycle if the second temperature is higher than the second reference temperature or equal to the second reference temperature.

9 Claims, 1 Drawing Sheet

METHOD FOR SPRAYING A FLUID ONTO A CHARGE AIR COOLER OF A MOTOR VEHICLE

CROSS REFERENCE TO RELATED APPLICATIONS

This application claims benefit to German Patent Application No. DE 10 2016 106 919.1, filed Apr. 14, 2016, which is hereby incorporated by reference herein.

FIELD

The present invention relates to a method for spraying a fluid onto a charge air cooler of a motor vehicle.

BACKGROUND

Methods of this kind are already known from the prior art. Publication DE 103 20 867 A1, for example, discloses a method for spraying water onto a charge air cooler, wherein the water is sprayed onto the charge air cooler in accordance with the temperature of the charge air cooler.

Publication EP 1 265 305 A2 discloses a method for spraying water onto a heating element of a motor vehicle, wherein the water is sprayed on in accordance with the cooling water temperature, the liquid volume and the air humidity of the environment.

Unregulated spraying of water onto charge air coolers is also known from rally sports.

SUMMARY

In an embodiment, the present invention provides a method for spraying a fluid onto a charge air cooler of a motor vehicle. The method includes measuring a first temperature with the aid of a first sensor of the motor vehicle; measuring a second temperature with the aid of a second sensor of the motor vehicle; comparing the first temperature with a first reference temperature by a controller of the motor vehicle; comparing the second temperature with a second reference temperature by the controller of the motor vehicle if the first temperature is higher than the first reference temperature or equal to the first reference temperature; and spraying at least some of the fluid onto the charge air cooler during a spray-on cycle if the second temperature is higher than the second reference temperature or equal to the second reference temperature.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figures 1, 2:
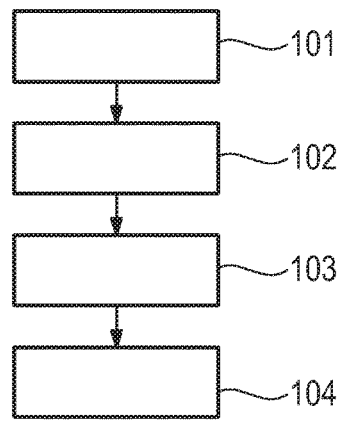
FIG. 1 shows, by way of example, a method for spraying a fluid onto a charge air cooler of a motor vehicle in accordance with one illustrative embodiment of the present invention.
FIG. 2 shows, by way of example, data sets for a method for spraying a fluid onto a charge air cooler of a motor vehicle in accordance with one illustrative embodiment of the present invention.

A method for spraying a fluid onto a charge air cooler of a motor vehicle is described herein, which method is particularly sparing in terms of resource consumption, reduces weight and is matched to the operating mode of the charge air cooler.

A method for spraying a fluid onto a charge air cooler of a motor vehicle according to an embodiment of the invention includes, in a first method step, a first temperature is measured with the aid of a first sensor of the motor vehicle and a second temperature is measured with the aid of a second sensor of the motor vehicle. In a second method step, the first temperature is compared with a first reference temperature by a control unit of the motor vehicle. In a third method step, the second temperature is compared with a second reference temperature by the control unit of the motor vehicle if, in the second method step, it is detected that the first temperature is higher than the first reference temperature or equal to the first reference temperature. In a fourth method step, at least some of the fluid is sprayed onto the charge air cooler during a spray-on cycle if, in the third method step, it is detected that the second temperature is higher than the second reference temperature or equal to the second reference temperature.

In comparison with the prior art, methods according to embodiments of the invention have the advantage that the spray-on cycle can be carried out in accordance with the first temperature and in accordance with the second temperature. A method which is matched particularly to the operating mode of the charge air cooler is thus possible in relation to the prior art. Moreover, methods according to embodiments of the invention allow more economical and less resource-hungry use of the fluid since more selective spraying is performed. This allows the use of a smaller fluid reservoir or fluid tank in comparison with the prior art and, at the same time, makes it possible to avoid torque and power losses. This is advantageous particularly in the case of production vehicles from the point of view of installation space and weight.

The fluid preferably comprises liquid or gaseous coolant, particularly preferably water.

The control unit is preferably an engine controller of the motor vehicle, e.g. a processor configured to execute processor executable instructions provided by software and/or firmware.

According to a preferred embodiment of the present invention, it is envisaged that, in the third method step, the second temperature is compared with a third reference temperature by the control unit of the motor vehicle if, in the second method step, it is detected that the first temperature is higher than the first reference temperature or equal to the first reference temperature, wherein, in the fourth method step, at least some of the fluid is sprayed onto the charge air cooler during the spray-on cycle if, in the third method step, it is detected that the second temperature is higher than the second reference temperature or equal to the second reference temperature and lower than the third reference temperature, wherein, in the fourth method step, at least some of the fluid is sprayed onto the charge air cooler during a further spray-on cycle if, in the third method step, it is detected that the second temperature is higher than the third reference temperature or equal to the third reference temperature.

Through the use of two spray-on cycles which can be activated in a manner dependent on whether the second temperature is within a first temperature interval or a second temperature interval, a method more finely tuned to the operating mode of the charge air cooler is possible. Moreover, it is advantageously possible to make less resource-hungry use of the fluid.

According to another preferred embodiment, it is envisaged that, in the third method step, the second temperature is compared with a fourth reference temperature by the control unit of the motor vehicle if, in the second method step, it is detected that the first temperature is higher than the first reference temperature or equal to the first reference temperature, wherein, in the fourth method step, at least some of the fluid is sprayed onto the charge air cooler during the further spray-on cycle if, in the third method step, it is detected that the second temperature is higher than the third reference temperature or equal to the third reference temperature and lower than the fourth reference temperature, wherein, in the fourth method step, at least some of the fluid is sprayed onto the charge air cooler during a third spray-on cycle if, in the third method step, it is detected that the second temperature is higher than the fourth reference temperature or equal to the fourth reference temperature.

Through the use of three spray-on cycles which can be activated in a manner dependent on whether the second temperature is within a first temperature interval or a second temperature interval or a third temperature interval, a method even more finely tuned to the operating mode of the charge air cooler is possible. Moreover, it is advantageously possible to make even less resource-hungry use of the fluid.

According to a preferred embodiment, it is envisaged that the first temperature is the ambient temperature of the motor vehicle. It is thereby advantageously possible to match the operating mode of the charge air cooler to the ambient temperature of the motor vehicle.

According to a preferred embodiment of the present invention, it is envisaged that the second temperature is measured in a further fluid flowing through the charge air cooler and/or at a motor vehicle component carrying the further fluid. The further fluid preferably comprises combustion air, preferably compressed combustion air, fed to the engine of the motor vehicle. The engine is preferably an internal combustion engine with engine pressure charging. As a further preference, the component carrying the further fluid is a component of an intake tract of the motor vehicle. It is thereby advantageously possible to allow for the temperature of the further fluid and/or of the motor vehicle component carrying the further fluid in the method for spraying on the fluid.

According to a preferred embodiment of the present invention, it is envisaged that the first reference temperature is a temperature threshold or a threshold value with the aid of which the possibility of activating the spraying of the fluid onto the heat exchanger can be determined. For example, it is thereby advantageously possible to ensure that spraying on can be activated only above a certain ambient temperature.

According to a preferred embodiment, it is envisaged that the second reference temperature is determined by the control unit from a characteristic curve and/or from a characteristic map and/or the third reference temperature is determined by the control unit from a second characteristic curve and/or from a second characteristic map and/or the fourth reference temperature is determined by the control unit from a third characteristic curve and/or from a third characteristic map. It is thereby advantageously possible for different spray-on cycles to be activated using different characteristic curves and/or characteristic maps. It is thereby furthermore advantageously possible to control and/or influence the spraying on process by means of different parameters, on which the different characteristic curves and/or characteristic maps are dependent. Thus, for example, a function is made available in the engine controller by means of which the spraying on process or the spray can be controlled in such a way in accordance with different parameters that, on the one hand, little fluid or liquid is consumed and that, on the other hand, it is ensured that a torque or power increase is made possible or can be provided.

According to another preferred embodiment of the present invention, it is envisaged that the characteristic curve and/or the characteristic map and/or the second characteristic curve and/or the second characteristic map and/or the third characteristic curve and/or the third characteristic map are determined in accordance with a speed of an engine of the motor vehicle and/or with a pedal value of a pedal of the motor vehicle. It is thereby advantageously possible to influence the spray by means of the speed of the engine and the pedal value.

A method for spraying a fluid onto a charge air cooler of a motor vehicle in accordance with an illustrative embodiment of the present invention is shown by way of example in FIG. 1. The method comprises a first method step 101, a second method step 102, a third method step 103 and a fourth method step 104. In the first method step 101, a first temperature is measured with the aid of a first sensor of the motor vehicle. In the first method step 101, a second temperature is furthermore measured with the aid of a second sensor of the motor vehicle. In the second method step 102, the first temperature is then compared with a first reference temperature by a control unit of the motor vehicle. After this, in the third method step 103, which is carried out after the second method step 102, the second temperature is compared with a second reference temperature, with a third reference temperature and with a fourth reference temperature by the control unit of the motor vehicle if, in the second method step 102, it is detected that the first temperature is higher than the first reference temperature or equal to the first reference temperature. In the fourth method step 104, which is carried out after the third method step 103, at least some of the fluid is then sprayed onto the charge air cooler during a spray-on cycle if, in the third method step 103, it is detected that the second temperature is higher than the second reference temperature or equal to the second reference temperature and lower than the third reference temperature. In the fourth method step 104, at least some of the fluid is furthermore sprayed onto the charge air cooler during a further spray-on cycle if, in the third method step 103, it is detected that the second temperature is higher than the third reference temperature or equal to the third reference temperature and lower than the fourth reference temperature. Finally, in the fourth method step 104, at least some of the fluid is sprayed onto the charge air cooler during a third spray-on cycle if, in the third method step 103, it is detected that the second temperature is higher than the fourth reference temperature or equal to the fourth reference temperature.

FIG. 2 shows illustrative data sets for a method for spraying a fluid onto a charge air cooler of a motor vehicle in accordance with one illustrative embodiment of the present invention. FIG. 2 here shows, by way of example, a first data set 1, a second data set 2 and a third data set 3.

FIG. 2 shows, by way of example, that the first data set 1, the second data set 2 and the third data set 3 each comprise values of a second reference temperature, of a third reference temperature and of a fourth reference temperature, each in units of ° C. (degrees Celsius), in each case as a function of a speed (N) in units of rpm (revolutions per minute) of an engine of a motor vehicle and in each case as a function of a pedal value (PV) in units of % (percent) of a pedal of the motor vehicle.

Illustrative characteristic maps corresponding to the first data set 1, the second data set 2 and the third data set 3 are approximated by mathematical functions, for example, in order to be able to represent the characteristic maps analytically. Provision is made here, for example, for a characteristic map to be determined from the first data set 1 by interpolation or regression. Provision is also made, for example, for a second characteristic map to be determined from the second data set 2 by interpolation or regression, and for a third characteristic map to be determined from the third data set 3 by interpolation or regression.

Furthermore, provision is made, for example, for a second reference temperature to be determined from the characteristic map by an engine controller of the motor vehicle and for a third reference temperature to be determined from the second characteristic map by the engine controller and for a fourth reference temperature to be determined from the third characteristic map by the engine controller.

The second reference temperature, third reference temperature and fourth reference temperature determined in this way, together with a first reference temperature determined by the engine controller, are used as follows in an illustrative method to spray water onto a charge air cooler.

In the first method step 101, a first temperature in air surrounding the motor vehicle, i.e. an ambient temperature, is measured. Moreover, a second temperature in combustion air fed to an engine of the motor vehicle and/or at a component of an intake tract of the motor vehicle is furthermore measured in the first method step 101. The second temperature is therefore an intake air temperature or an intake manifold temperature, for example.

Then, preferably at a later time than the first method step 101, the ambient temperature is, for example, compared in the second method step 102 with the first reference temperature by the control unit of the motor vehicle, wherein the first reference temperature is a threshold value.

In the third method step 103, preferably at a later time than the second method step 102, the intake air temperature or the intake manifold temperature is furthermore compared with the second reference temperature, with the third reference temperature and with the fourth reference temperature by the control unit of the motor vehicle, for example.

If the ambient temperature is higher than the threshold value or equal to the threshold value and the intake air temperature or the intake manifold temperature is higher than the second reference temperature or equal to the second reference temperature and lower than the third reference temperature, the spray-on cycle is activated. If the ambient temperature is higher than the threshold value or equal to the threshold value but the intake air temperature or the intake manifold temperature is higher than the third reference temperature or equal to the third reference temperature and lower than the fourth reference temperature, the further spray-on cycle is activated. Finally, if the ambient temperature is higher than the threshold value or equal to the threshold value and the intake air temperature or the intake manifold temperature is higher than the fourth reference temperature or equal to the fourth reference temperature, the third spray-on cycle is activated.

To activate the spray-on cycle, the further spray-on cycle and the third spray-on cycle, the spray-on unit receives activation information from a control unit of the motor vehicle, for example. When the spray-on unit receives the activation information, the water is sprayed onto the charge air cooler in accordance with the spray-on cycle, the further spray-on cycle or the third spray-on cycle.

The spray-on cycle is thus activated on the basis of the first data set 1, shown in FIG. 2, when the intake air temperature or intake manifold temperature rises and, by way of example, comprises two seconds of water spraying and one second without water spraying in alternation. If the intake air temperature or intake manifold temperature rises further, the further spray-on cycle is activated. The further spray-on cycle comprises three seconds of water spraying and one second without water spraying in alternation, for example. If the intake air temperature or the intake manifold temperature rises even further, the third spray-on cycle is then activated. The third spray-on cycle comprises continuous water spraying, for example.

According to an embodiment of the present invention, water spraying onto a charge air cooler is thus activated when, for example, the intake manifold temperature is higher than a value from a characteristic map and the ambient temperature is higher than a threshold value. As illustrated here by way of example, activation of water spraying takes place in three stages.

The following example is now presented with reference to the data sets illustrated by way of example in FIG. 2. If a driver specifies a pedal value of 95% at 5000 rpm and the intake air temperature rises from 45 to 60° C., the spray-on cycle or a first stage is activated. In the spray-on cycle or in the first stage, water spraying is on for two seconds and then off for one second. If the intake air temperature then rises further to 64° C., the further spray-on cycle or a second stage is activated.

Finally, for example, provision is also made according to an embodiment of the invention for a maximum duration of water spraying or of the spray-on cycle and/or of the further spray-on cycle and/or of the third spray-on cycle to be transmitted to the spray-on unit by the engine controller, for example, with the result that the fluid is sprayed on only during a time of the maximum duration by the spray-on unit. Provision is furthermore also made, for example, for a shutoff time of the water spraying or of the spray-on cycle and/or of the further spray-on cycle and/or of the third spray-on cycle to be transmitted to the spray-on unit by the engine controller, for example, with the result that the fluid is not sprayed on by the spray-on unit during a time of the shutoff time. Provision is furthermore also made, for example, for the maximum duration and the shutoff time to be provided in such a way that they can be populated with data, in particular that data can be read into the control unit from an external storage medium and stored in the control unit.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for spraying a fluid onto a charge air cooler of a motor vehicle, the method comprising:
   measuring a first temperature with the aid of a first sensor of the motor vehicle, the first temperature being a temperature of ambient air surrounding the motor vehicle;
   measuring a second temperature with the aid of a second sensor of the motor vehicle, the second temperature being a temperature of intake air fed to an engine of the motor vehicle or a temperature of an intake manifold of the motor vehicle;
   comparing the first temperature with a first reference temperature by a controller of the motor vehicle;
   comparing the second temperature with a second reference temperature by the controller of the motor vehicle if the first temperature is higher than the first reference temperature or equal to the first reference temperature; and
   spraying at least some of the fluid onto the charge air cooler during a spray-on cycle if the second temperature is higher than the second reference temperature or equal to the second reference temperature.

2. A method for spraying a fluid onto a charge air cooler of a motor vehicle, the method comprising:
   measuring a first temperature with the aid of a first sensor of the motor vehicle;
   measuring a second temperature with the aid of a second sensor of the motor vehicle;
   comparing the first temperature with a first reference temperature by a controller of the motor vehicle;
   comparing the second temperature with a second reference temperature by the controller of the motor vehicle if the first temperature is higher than the first reference temperature or equal to the first reference temperature; and
   spraying at least some of the fluid onto the charge air cooler during a spray-on cycle if the second temperature is higher than the second reference temperature or equal to the second reference temperature,
   wherein the second temperature is compared with a third reference temperature by the controller of the motor vehicle if the first temperature is higher than the first reference temperature or equal to the first reference temperature,
   wherein at least some of the fluid is sprayed onto the charge air cooler during the spray-on cycle if the second temperature is higher than the second reference temperature or equal to the second reference temperature and lower than the third reference temperature, and
   wherein at least some of the fluid is sprayed onto the charge air cooler during a further spray-on cycle if the second temperature is higher than the third reference temperature or equal to the third reference temperature.

3. The method as claimed in claim 2, wherein the second temperature is compared with a fourth reference temperature by the controller of the motor vehicle if the first temperature is higher than the first reference temperature or equal to the first reference temperature,
   wherein at least some of the fluid is sprayed onto the charge air cooler during the further spray-on cycle if the second temperature is higher than the third reference temperature or equal to the third reference temperature and lower than the fourth reference temperature, and
   wherein at least some of the fluid is sprayed onto the charge air cooler during a third spray-on cycle if the second temperature is higher than the fourth reference temperature or equal to the fourth reference temperature.

4. The method as claimed in claim 3, wherein the second reference temperature is determined by the controller from a characteristic curve and/or from a characteristic map and/or wherein the third reference temperature is determined by the controller from a second characteristic curve and/or from a second characteristic map and/or wherein the fourth reference temperature is determined by the controller from a third characteristic curve and/or from a third characteristic map.

5. The method as claimed in claim 4, wherein the characteristic curve and/or the characteristic map and/or the second characteristic curve and/or the second characteristic map and/or the third characteristic curve and/or the third characteristic map are determined in accordance with a speed of an engine of the motor vehicle and/or with a pedal value of a pedal of the motor vehicle.

6. The method as claimed in claim 1, wherein the second temperature is compared with a third reference temperature by the controller of the motor vehicle if the first temperature is higher than the first reference temperature or equal to the first reference temperature,
   wherein at least some of the fluid is sprayed onto the charge air cooler during the spray-on cycle if the second temperature is higher than the second reference temperature or equal to the second reference temperature and lower than the third reference temperature, and
   wherein at least some of the fluid is sprayed onto the charge air cooler during a further spray-on cycle if the second temperature is higher than the third reference temperature or equal to the third reference temperature.

7. The method as claimed in claim 6, wherein the second temperature is compared with a fourth reference temperature by the controller of the motor vehicle if the first temperature is higher than the first reference temperature or equal to the first reference temperature,
   wherein at least some of the fluid is sprayed onto the charge air cooler during the further spray-on cycle if the second temperature is higher than the third reference temperature or equal to the third reference temperature and lower than the fourth reference temperature, and
   wherein at least some of the fluid is sprayed onto the charge air cooler during a third spray-on cycle if the second temperature is higher than the fourth reference temperature or equal to the fourth reference temperature.

8. The method as claimed in claim 7, wherein the second reference temperature is determined by the controller from a characteristic curve and/or from a characteristic map and/or wherein the third reference temperature is determined by the controller from a second characteristic curve and/or from a second characteristic map and/or wherein the fourth reference temperature is determined by the controller from a third characteristic curve and/or from a third characteristic map.

9. The method as claimed in claim 8, wherein the characteristic curve and/or the characteristic map and/or the second characteristic curve and/or the second characteristic map and/or the third characteristic curve and/or the third characteristic map are determined in accordance with a speed of an engine of the motor vehicle and/or with a pedal value of a pedal of the motor vehicle.

\* \* \* \* \*